United States Patent [19]

Hoch et al.

[11] Patent Number: 5,443,088
[45] Date of Patent: Aug. 22, 1995

[54] SQUIB VALVE

[75] Inventors: Elisha Hoch, Rehovot; Israel Schnitzer, Tel Aviv; Victor Yusim, Rishon Lezion, all of Israel

[73] Assignee: Israel Aircraft Industries Ltd., Lod, Israel

[21] Appl. No.: 235,307

[22] Filed: Apr. 29, 1994

[30] Foreign Application Priority Data

May 5, 1993 [IL] Israel .................................. 105616

[51] Int. Cl.⁶ .............................................. F16K 17/40
[52] U.S. Cl. .................................. 137/68.13; 137/514.7; 251/54
[58] Field of Search ...................... 137/68.2, 514.7; 251/54, 73

[56] References Cited

U.S. PATENT DOCUMENTS

| 4,190,076 | 2/1980 | Cameron et al. | 251/54 X |
| 4,221,204 | 9/1980 | Meyer | 251/54 X |
| 4,589,496 | 5/1986 | Rozniecki | 137/68.2 X |
| 4,619,285 | 10/1986 | Piet | 137/68.2 |

Primary Examiner—John Rivell
Attorney, Agent, or Firm—Jacobson, Price, Holman & Stern

[57] ABSTRACT

A squib valve which has an inlet port associated with a pressurized fluid source, an outlet port, flow initiation apparatus for initiating a flow of the pressurized fluid between the inlet port and the outlet port, apparatus for activating the flow initiation apparatus, and flow control apparatus for permitting an increase in the flow at no more than a predetermined maximum rate of increase such that a maximum volumetric flow via the outlet port is reached only after a predetermined minimum period of time has elapsed, thereby reducing the occurrence and magnitude of shock and hammering downstream of the outlet port that would be provided by an uncontrolled outflow of the pressurized fluid.

5 Claims, 4 Drawing Sheets

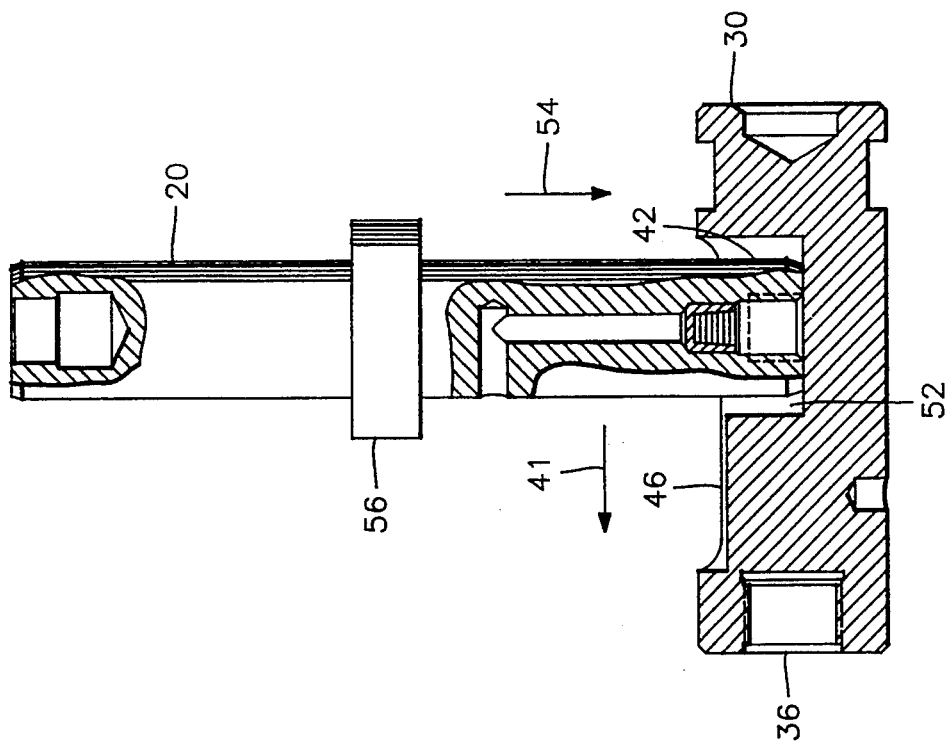
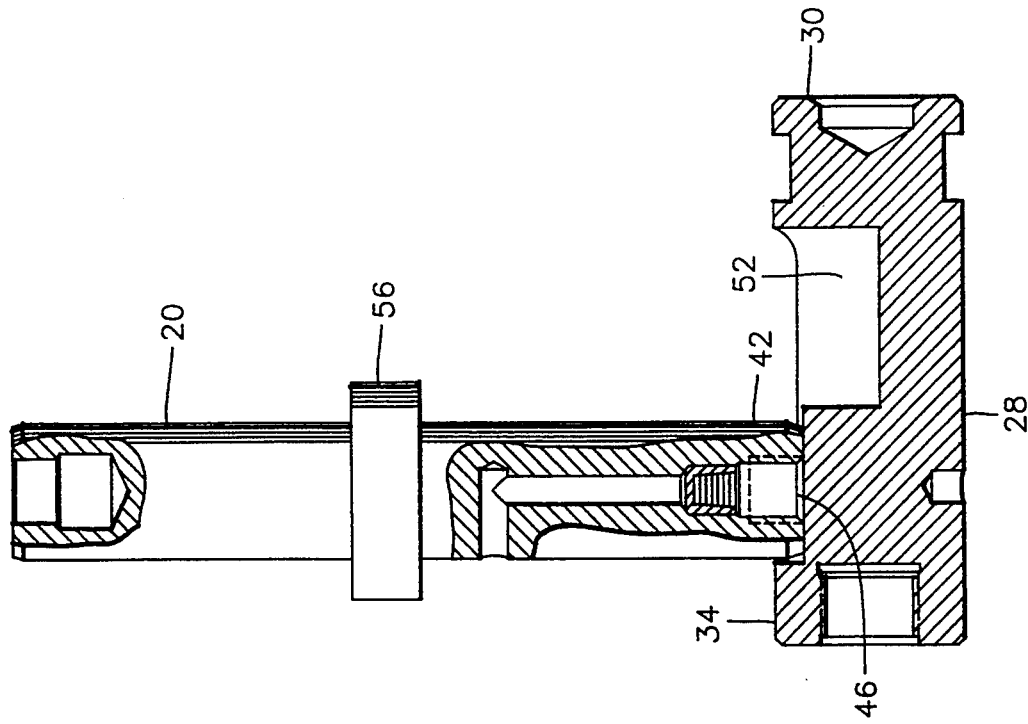

SQUIB VALVE

FIELD OF THE INVENTION

The present invention relates to squib valves.

BACKGROUND OF THE INVENTION

A squib valve is a single action valve used for permitting rapid exit of a fluid from a pressurized fluid source. Squib valves are used to permit evacuation of a fluid stored under pressure. Typically, although not exclusively, squib valves are used to permit rapid release of fluids retained under a wide range of pressures, typically 1,000–10,000 psi. Squib valves are used, for example, in aircraft ejector mechanisms, missile firing mechanisms, missile fuel supply systems and fire extinguishing systems.

Among problems that exist with conventional squib valves are the occurrence of shock and hammering downstream of the valves. The shock and hammering are caused by the sudden, uncontrolled release of pressurized fluid, wherein an outflow from a squib valve increases, almost instantaneously, from a zero flow rate to a maximum flow rate. This problem is particularly acute with highly pressurized fluids.

Conventionally, squib valves are one-shot devices, and employ a "guillotine-type" or "penetration-type" action for forming a fluid outlet. A problem with both these types of squib valves is that the cutting or piercing action by which the fluid outlet is formed causes particles of the material which formerly covered the outlet to be released into the fluid flow. These particles are essentially contaminant particles. Accordingly, these prior art squib valves are not suitable for use with an ultra-high purity gas supply without a suitable filtration system.

Furthermore, due to the high cost of squib valves, it would be desirable to provide a squib valve that is re-usable, especially when being used in ground applications and qualification tests, for example.

SUMMARY OF THE INVENTION

The present invention seeks to provide a squib valve which permits a rapid, controlled outflow of a fluid from a pressurized fluid source, thereby substantially reducing the occurrence and intensity of shock and hammering downstream of the valve.

The present invention further seeks to provide a squib valve that is reusable, and the operation of which does not cause release of contaminant particles into a fluid flow therethrough and which is suitable, therefore, for use with an ultra-high purity gas supply without requiring a filtration system.

There is provided, therefore, in accordance with a preferred embodiment of the invention, a squib valve which has an inlet port associated with a pressurized fluid source, an outlet port, flow initiation apparatus for initiating a flow of the pressurized fluid between the inlet port and the outlet port, apparatus for activating the flow initiation apparatus, and flow control apparatus for permitting an increase in the flow at no more than a predetermined maximum rate of increase such that a maximum volumetric flow via the outlet port is reached only after a predetermined minimum period of time has elapsed, thereby reducing the occurrence and magnitude of shock and hammering downstream of the outlet port that would be provided by an uncontrolled outflow of the pressurized fluid.

Additionally in accordance with a preferred embodiment of the invention, the squib valve also includes flow prevention apparatus arranged in a first operative orientation with respect to the inlet port and the outlet port for preventing fluid flow along the fluid path, and wherein the flow initiation apparatus is operative to permit movement of the flow prevention apparatus into a second operative orientation in response to pressure applied by the pressurized fluid to the flow prevention apparatus, thereby to initiate a flow of the pressurized fluid along the fluid path.

Further in accordance with a preferred embodiment of the invention, the apparatus for activating the flow initiation apparatus includes a selectably actuable pressure source.

Additionally in accordance with a preferred embodiment of the invention, the flow control apparatus includes apparatus for retarding the movement of the flow prevention apparatus between the first and second operative orientations so as to permit maximum volumetric outflow of the fluid only after the predetermined minimum period of time has elapsed.

BRIEF DESCRIPTION OF THE DRAWINGS

The present invention will be more fully appreciated and understood from the following detailed description, taken in conjunction with the drawings in which:

FIGS. 2A and 2B are partially cut-away side view illustrations of portions of first and second piston members of the squib valve of the present invention, shown in respective first and second operative orientations.

DETAILED DESCRIPTION OF A PREFERRED EMBODIMENT

Figure 1A:
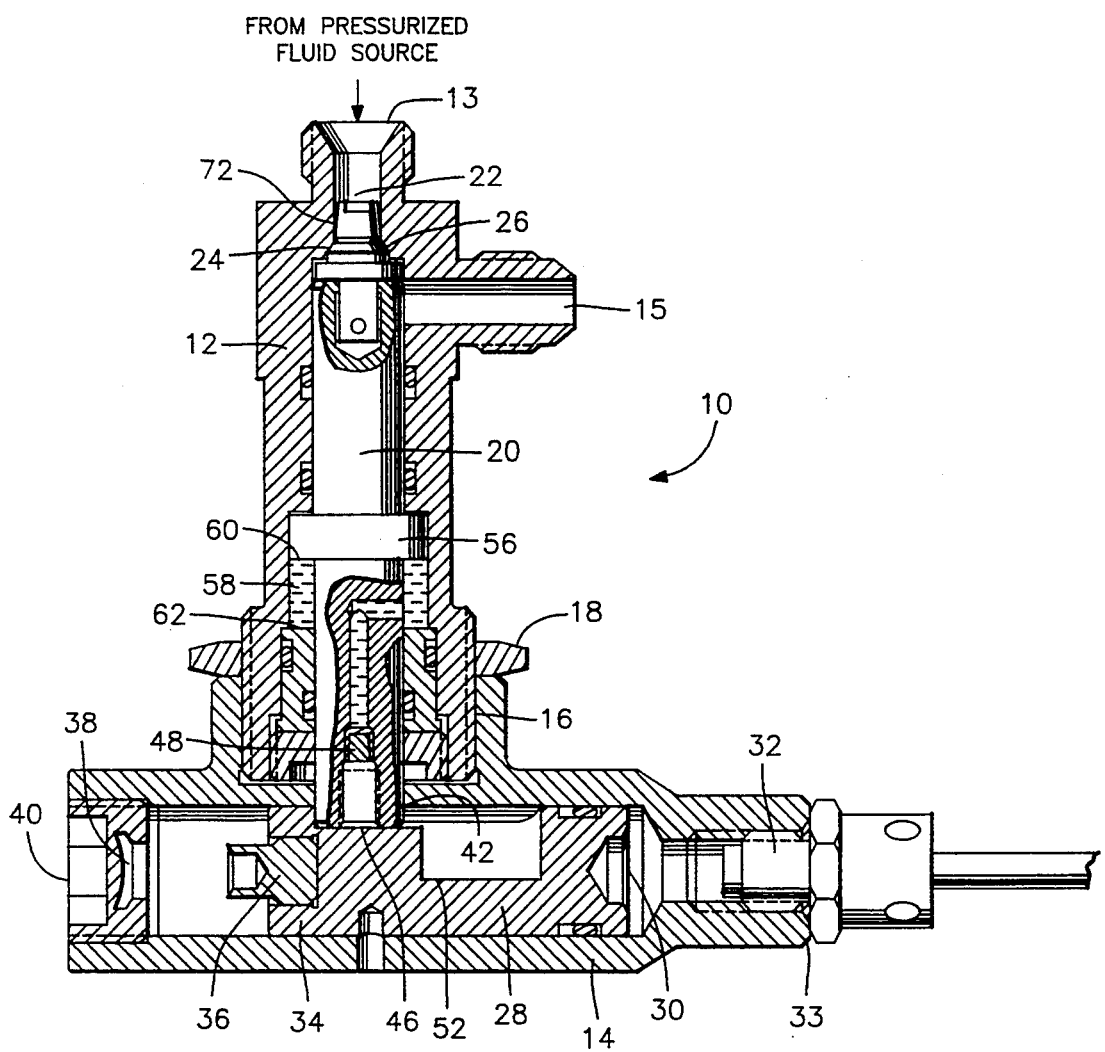
FIGS. 1A and 1B are partially cut-away side view illustrations of a squib valve constructed and operative in accordance with the present invention, in respective first and second operative orientations.
Figure 1B:
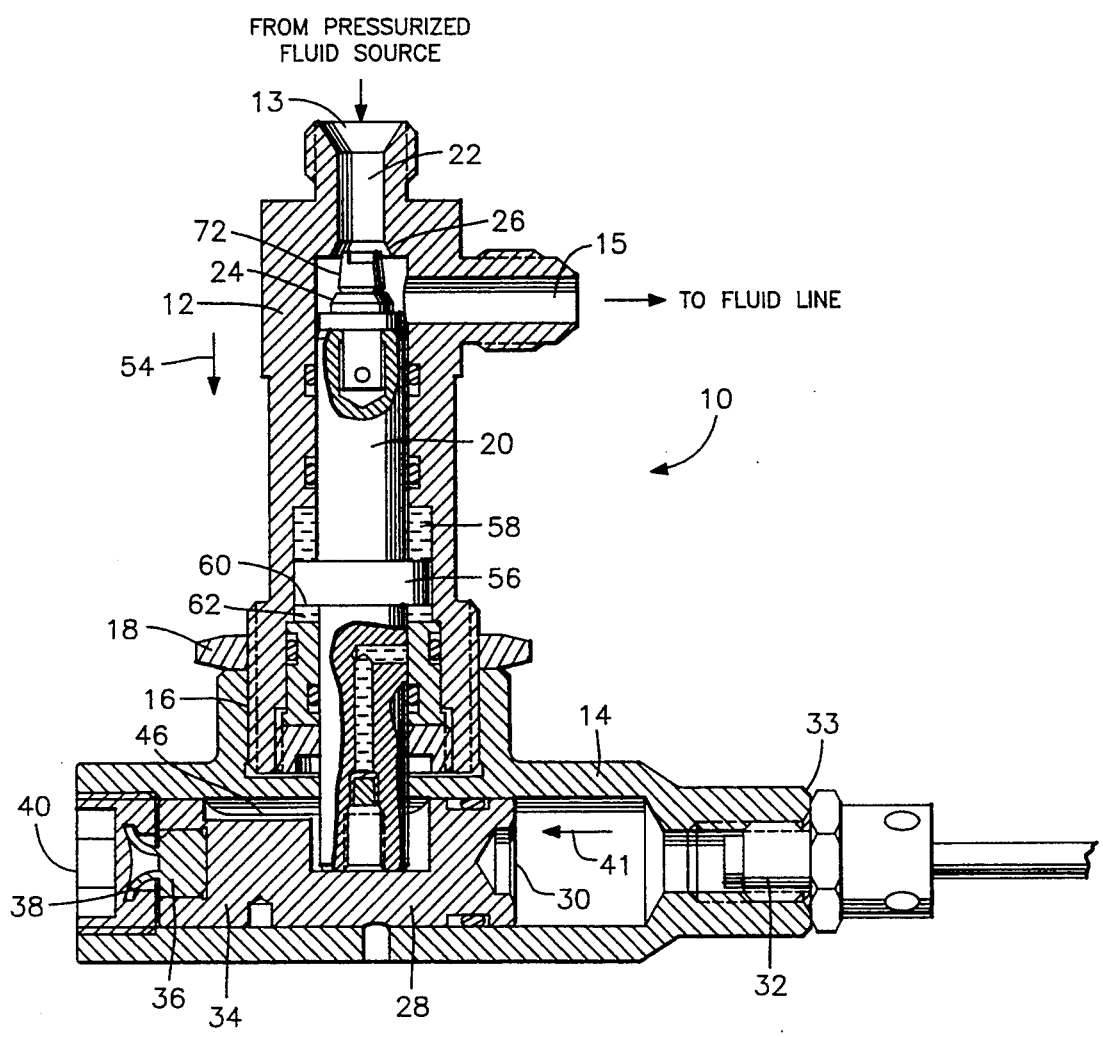

Reference is now made to FIGS. 1A and 1B, in which is illustrated a squib valve, referenced generally 10, which is constructed and operative in accordance with a preferred embodiment of the invention. Squib valve 10 is a re-usable single action valve which substantially reduces the occurrence and magnitude of shock and hammering downstream of the valve.

The reduction in shock waves is provided by initiating a controlled outflow of the fluid so as to permit only a gradual increase in the flow. The increase in the flow is limited to no more than a predetermined rate of increase and continues until, after a predetermined minimum period of time has elapsed, a maximum volumetric flow has been reached. This will be appreciated from the ensuing description.

Squib valve 10 comprises first and second housing portions, respectively referenced 12 and 14. Typically, housing portions 12 and 14 are connected as by being screwed together at location 16. A locking nut 18 is also provided.

Figure 3:
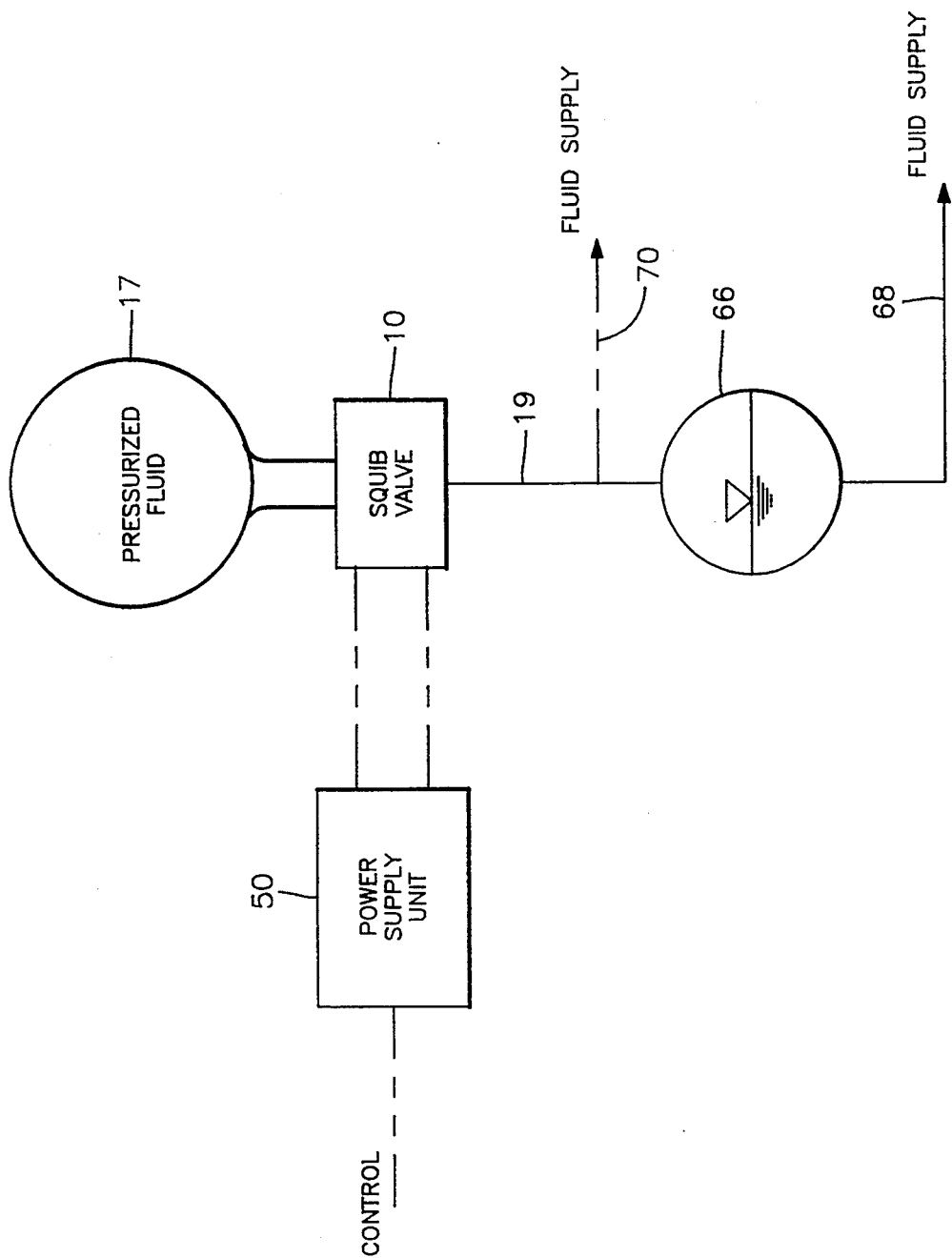
FIG. 3 is a generalized block diagram of a control system employing the squib valve of the present invention.

First housing portion 12 has a fluid inlet port 13 which is associated with a pressurized fluid source 17 (FIG. 3), and a fluid outlet port 15 which is associated with a fluid supply line 19 (FIG. 3). A first piston 20 is arranged in first housing portion 12 for axial movement therein towards second housing portion 14. Piston 20 is configured such that, in a first operative orientation (FIGS. 1A and 2A), it prevents fluid flow along a flow path extending between inlet port 13 and outlet port 15. When piston 20 is in a second operative orientation (FIGS. 1B and 2B), fluid flow is permitted along the flow path extending between inlet port 13 and outlet port 15.

According to the present embodiment, first piston 20 and first housing portion 12 define a fluid impermeable seal at a first end portion 22 of first piston 20. More particularly, piston 20 defines, at first end 22 thereof, a typically conical male portion 24 which is configured for sealing engagement with a corresponding female portion 26 formed in housing portion 12. Preferably, both housing portion 12 and piston 20 are made from metal, and the seal is a metal-to-metal seal. Furthermore, piston 20 is typically made from a metal that has a hardness value less than that of the metal from which housing portion 12 is made. By way of example, first housing portion 12 and piston 20 may be made from different hardness grades of stainless steel.

A second piston 28 is provided in second housing 14 of squib valve 10, generally at right angles to first piston 20. In FIGS. 1A and 2A, second piston 28 is illustrated in a first operative position, whereat it retains first piston 20 in its first operative orientation so as to withstand the force applied thereto by the pressurized fluid and prevent escape thereof past the first piston 20.

In FIGS. 1B and 2B, second piston 28 is illustrated in a second operative position, and accordingly, first piston 20 has been moved, by the force of the pressurized fluid, into its second operative orientation. In this position, the pressurized fluid is permitted to flow along the flow path extending between inlet port 13 and outlet port 15.

Second piston 28 has a first end 30 and a second end 34 which are associated with respective first and second ends 33 and 40 of second housing portion 14. First end 30 of second piston 28 is associated with a selectably operable pressure source 32 mounted in first end 33 of second housing portion 14. Second end 34 of second piston 28 has mounted thereon a plastically deformable locking shoe 36 which is arranged for retentive engagement with a locking recess 38 formed at second end 40 of second housing portion 14.

Typically, pressure source 32 is any suitable, electrically operable pressure source. Preferably, pressure source 32 is a pyrotechnic device that may be mounted in first end 33 of housing portion 14, and which, when activated, provides a pressure wave that forces second piston 28 rapidly towards second end 40 of second housing portion 14, as indicated by arrow 41 (FIGS. 1B and 2B). The pressure wave provided by pressure source 32 may be of any predetermined magnitude according to the requirements of a specific device and the application thereof. Typically, the magnitude of the pressure wave provided by pressure source 32 may be up to several thousand pounds per square inch. A typical pyrotechnic device suitable, among others, for use in the present invention is manufactured by PYROMECA of Toulon, France.

Pressure source 32 is activated by provision thereto of a predetermined electrical signal, such as from a suitable power supply unit 50 (FIG. 3). Pressure generated by pressure source 32 forces second piston 28 towards second end 40 of second housing portion 14, in the direction of arrow 41 (FIGS. 1B and 2B), such that locking shoe 36 engages and is plastically deformed by locking recess 38 so as to become mechanically locked therewith.

As second piston 28 moves towards second end 40 of second housing portion 14, a recess 52 adjacent to a stepped portion 46 of second piston 28 is moved into coaxial registration with first piston 20. In response to the force applied to first end 22 of first piston 20 by the pressurized fluid, first piston 20 is forced into recess 52, thereby to permit fluid flow between the inlet and outlet ports 13 and 15 and out into the fluid line 19. Motion of first piston 20 into recess 52 is indicated by arrow 54 (FIGS. (1B and 2B).

In order to prevent an instantaneous occurrence of maximum volumetric flow through outlet port 15, and thereby to prevent undesirable shock and hammering, valve 10 is configured to permit an increase in the flow at no more than a predetermined maximum rate of increase such that maximum volumetric flow via outlet port 15 is reached only after a predetermined minimum period of time has elapsed. Accordingly, the occurrence and magnitude of shock and hammering downstream of valve 10 are reduced in comparison with the shock and hammering that would be provided by an uncontrolled outflow of the pressurized fluid.

In order to obtain the above-described flow regulation, first piston 20 has formed thereon a piston head 56 which is operative to move within an annular fluid reservoir 58 that is defined by a widened cylindrical portion of first housing portion 12. Fluid reservoir 58 is filled with a selected hydraulic fluid, such as a silicone oil of at least a minimum selected viscosity. Typically, the fluid reservoir 58 may be filled via a filling cap 48 (FIG. 1A), located at a second end 42 of first piston 20.

Fluid reservoir 58 is configured so as to have a diameter that is very slightly larger than the diameter of the piston head 56, such that fluid flow around the piston head is possible. After second piston 28 has been moved into its second operative position such that recess 52 is brought into registration with first piston 20, full engagement of second end 42 of first piston 20 in recess 52 occurs only upon movement of piston head 56 from a first end 60 of reservoir 58 (FIG. 1A) to a second end 62 thereof (FIG. 1B). In order for this movement to occur, the viscous hydraulic fluid in the reservoir has to flow around the piston head towards the first end of the reservoir.

As seen in FIGS. 1A and 1B, a very small outflow of the pressurized fluid is initiated in immediate response to an initial axial movement of the first piston 20 into recess 52. A maximum volumetric flow through outlet port 15 occurs when full engagement between second end 42 of first piston 20 becomes fully engaged with recess 52. Accordingly, as first piston 20 moves between its first and second operative orientations, the outflow of pressurized fluid increases from a zero initial flow to a maximum flow.

It will thus be appreciated that the present invention provides a squib valve which has a built-in predetermined time delay between flow initiation and maximum flow.

Furthermore, in accordance with a preferred embodiment of the invention, first end portion 22 of first piston 20 has a slight conical end portion 72 (FIGS. 1A and 1B). Fluid flow past end portion 72 is thus imparted with predetermined flow characteristics that help to reduce shock and hammering downstream of the valve.

A typical use of valve 10 is in a control system such as shown in FIG. 3. The control system includes a container 17 of a pressurized fluid, such as a liquid or a gas, squib valve 10, a power supply unit 50 for activating the squib valve, an accumulator tank 66, and a fluid line 19 connecting squib valve 10 to accumulator tank 66.

In response to an input signal via a control unit (not shown), a power supply unit 50 provides a predetermined electrical signal to pressure unit 32 (FIGS. 1A and 1B) of squib valve 10. Squib valve 10 is activated so as to permit release of the pressurized fluid stored in container 17. The released fluid passes, under pressure, to accumulator tank 66, so as to cause evacuation of a second fluid therefrom via a supply line 68. In the present example, the pressurized fluid is typically a gas, while the second fluid is a liquid.

In an alternative embodiment, the pressurized fluid may be provided directly to a supply line 70.

Referring once again to FIGS. 1A and 1B, the built-in time delay between initiation of flow and achieving maximum flow through outlet port 15 is dependent, inter alia, on the relative dimensions of the various components of the squib valve, and on the viscosity and other flow characteristics of the hydraulic fluid in reservoir 58. Typically, the time delay is in the range 10–300 ms. It will be appreciated by persons skilled in the art that a reduction in the amount of hydraulic fluid used will cause a corresponding shortening in the time delay.

It will be appreciated by persons skilled in the art that although, in a control system such as that described above in conjunction with FIG. 3, a delay of about 300 ms may not be significant and compensation therefor may be made relatively easily, a steady increase of the outflow of the pressurized fluid, rather than a sudden increase in flow, reduces both the occurrence and the magnitude of shock and hammering downstream from the squib valve, thereby protecting portions of the control system (FIG. 3) downstream of valve 10.

A further advantage of the squib valve of the present invention is that, with the exception of locking shoe 36, the mechanical integrity of the valve is maintained during operation. Accordingly, after cleaning and replacement of locking shoe 36, squib valve 10 may be re-used.

Yet a further advantage of the squib valve of the invention is that squib valve 10 may be used in ultra-high purity gas supply applications without giving rise to contamination thereof.

It will be appreciated by persons skilled in the art that the invention is not limited by what has been particularly shown and described hereinabove. Rather, the scope of the present invention is defined only by the claims which follow:

We claim:
1. A squib valve which comprises:
an inlet port associated with a pressurized fluid source;
an outlet port;
a flow initiator for initiating a flow of the pressurized fluid between said inlet port and said outlet port;
an activator for activating said flow initiator and comprising a selectably actuable pressure source;
a flow controller for permitting an increase in the flow at no more than a predetermined maximum rate of increase such that a maximum volumetric flow via said outlet port is reached only after a predetermined minimum period of time has elapsed, thereby reducing the occurrence and magnitude of shock and hammering downstream of said outlet port that would be provided by an uncontrolled outflow of the pressurized fluid; and
a flow preventer arranged in a first operative orientation with respect to said inlet port and said outlet port for preventing fluid flow along said fluid path, and wherein said flow initiator is operative to permit movement of said flow preventer into a second operative orientation in response to pressure applied by the pressurized fluid to the flow preventer, thereby to initiate a flow of the pressurized fluid along said fluid path, and wherein said flow controller comprises:
a flow retarder for retarding the movement of said flow prevention means between said first and second operative orientations so as to permit maximum volumetric outflow of the fluid only after the predetermined minimum period of time has elapsed;
a first housing portion defining a fluid flow path, and
a second housing portion arranged transversely to said first housing portion and whose interior communicates with the interior of said first housing portion,
and wherein, in said first operative orientation, said flow preventer is arranged in said first housing portion so as to prevent fluid flow along said flow path, and in said second operative orientation said flow preventer extends transversely into the interior of said second housing portion.

2. Apparatus according to claim 1, and wherein said flow preventer comprises a first piston and said flow initiator comprises a second piston mounted in said second housing portion and which is movable between first and second positions,
and wherein, when in said first position, said second piston is operative to lock said first piston in said first operative orientation and, when in said second position, said second piston permits movement of said first piston to said second operative orientation.

3. Apparatus according to claim 2, and wherein said flow retarder comprises a hydraulic assembly for resisting instantaneous movement of said first piston from said first operative orientation into said second operative orientation.

4. Apparatus according to claim 1, and wherein said selectably operable pressure source comprises a pressure generator responsive to an electrical signal.

5. Apparatus according to claim 4, and wherein said pressure generator comprises a pyrotechnic pressure device.

* * * * *